May 31, 1966    H. S. SAYRE    3,253,864
CONVEYOR DISCHARGE SYSTEM
Filed March 11, 1964    3 Sheets-Sheet 1
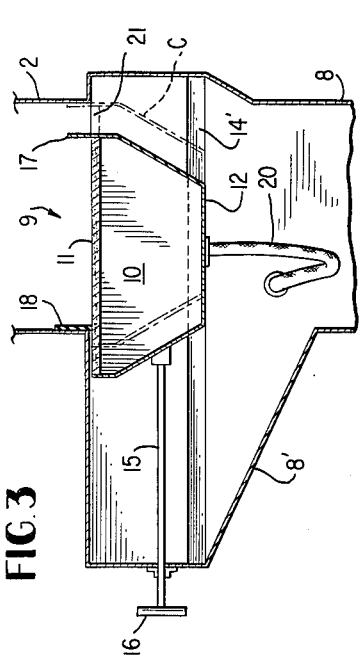
FIG.3
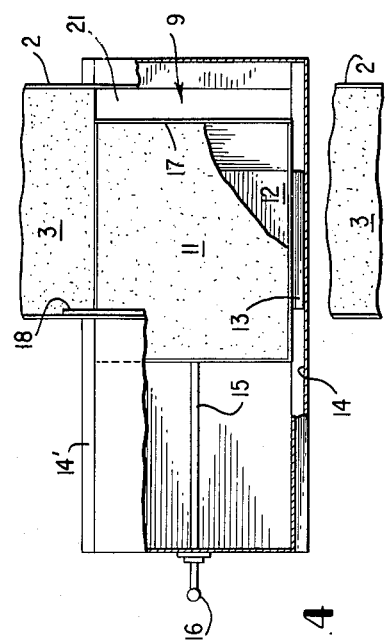
FIG.4
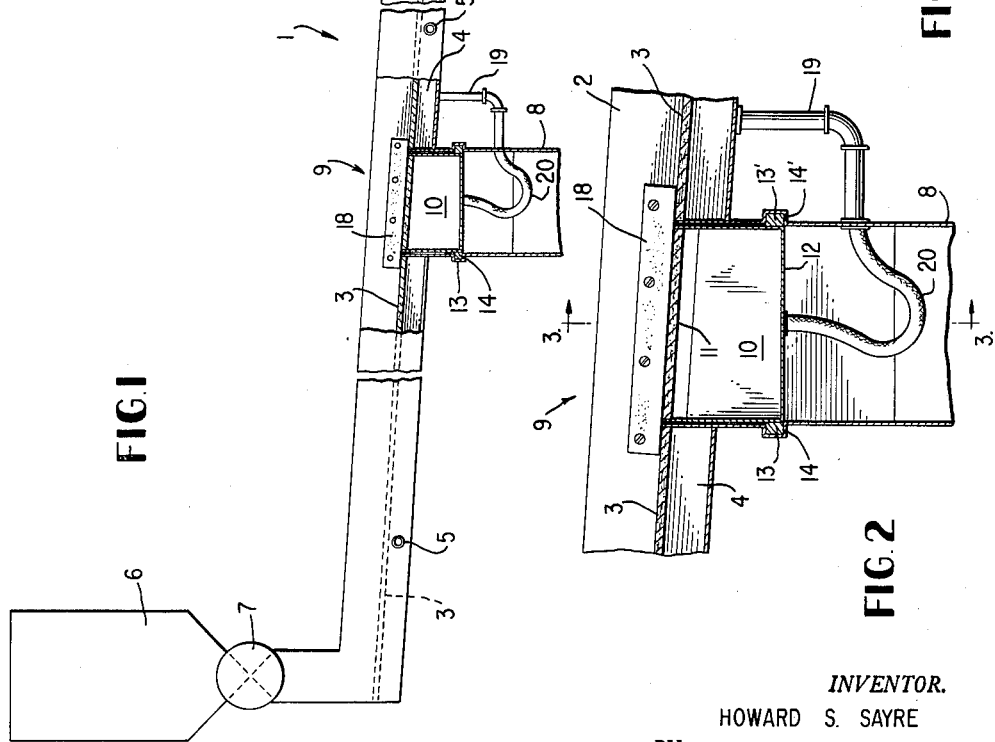
FIG.1
FIG.2
INVENTOR.
HOWARD S. SAYRE
BY
ATTORNEYS May 31, 1966  H. S. SAYRE  3,253,864
CONVEYOR DISCHARGE SYSTEM
Filed March 11, 1964  3 Sheets-Sheet 2
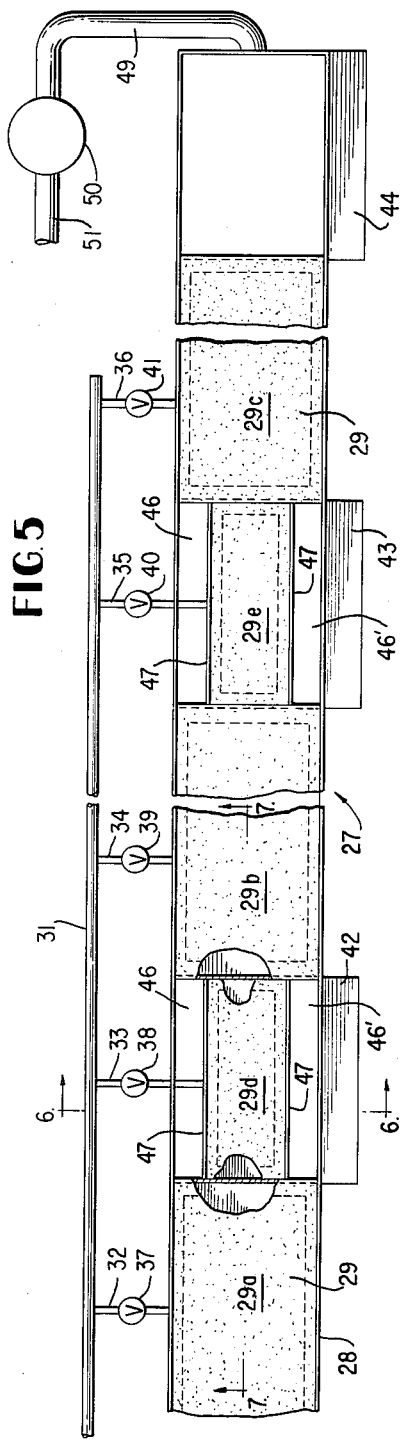
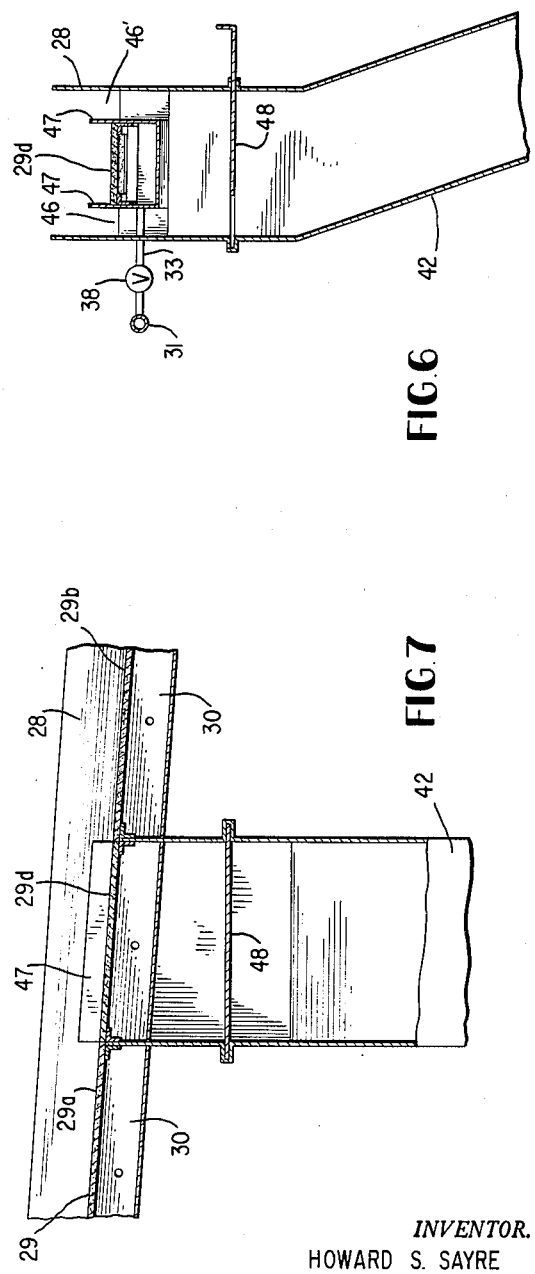
INVENTOR.
HOWARD S. SAYRE
BY
*Prinnie Edmunds Morton Taylor and Adam*
ATTORNEYS

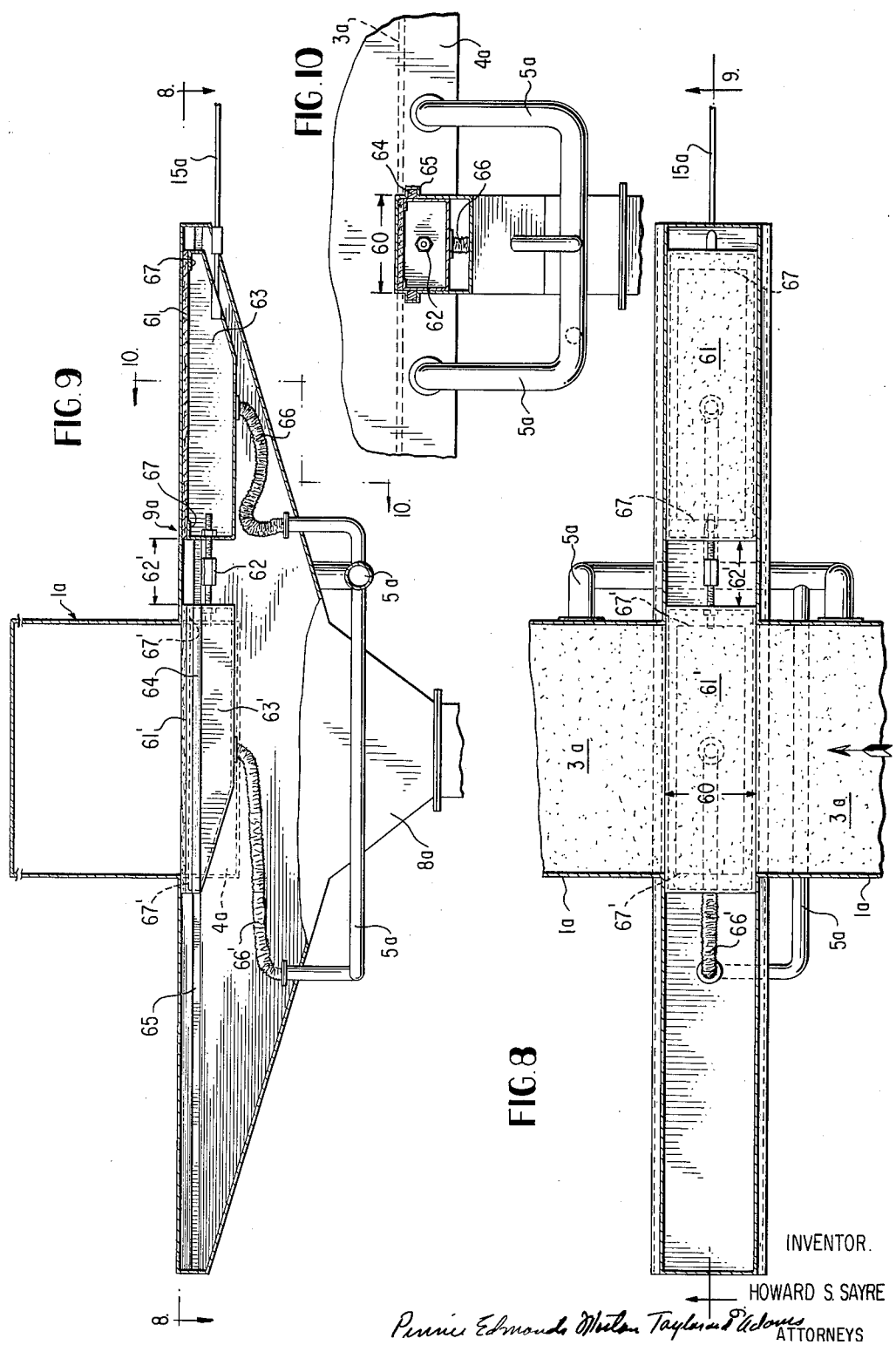

United States Patent Office

3,253,864
Patented May 31, 1966

3,253,864
CONVEYOR DISCHARGE SYSTEM
Howard Stuart Sayre, Bethlehem, Pa., assignor to
Fuller Company
Filed Mar. 11, 1964, Ser. No. 351,067
25 Claims. (Cl. 302—29)

The present invention relates to the controlled discharge of material from fluid-actuated conveyors, and is more particularly concerned with the accurate withdrawal of material at one or more points intermediate the ends of such conveyors.

In accordance with one form of the invention, the fluid-activated, gravity-flow conveyor has shuttle gate sections, each comprising a portion of the gas-permeable deck of the conveyor, along which the material flows and an underlying plenum chamber, which are mounted to be moved transversely of the direction of flow of material along the conveyor to provide a travelling gap in the conveying surface through which material flowing along the conveyor surface will flow or spill into an offtake pipe leading to the unit to which the material is to be supplied.

In a second form of the invention movable gates spaced along the conveyor are not utilized but at those places where it is desired to discharge material from the conveyor into underlying offtake pipes, the width of the conveying surface along which the material is flowing is narrower than the sections of the conveyor at the intervening portions to provide a gap in the conveying surface at one or both sides of the narrower section through which the material will flow or spill into the offtake pipes.

In still another form of the invention, the fluid-activated gravity conveyor has at least two intermediate, gas-permeable conveying sections which are spaced from each other transversely of the conveyor and adapted to move laterally with respect to the conveyor to provide a travelling gap in the conveying surface through which representative and uniform samples of conveying material can be obtained for analysis.

The invention will be further described in connection with the accompanying drawings in which:

FIG. 1 is a side elevational view of a fluid-activated, gravity-flow conveyor, partly in section, embodying one form of the invention;

FIG. 2 is a sectional view on an enlarged scale of a portion of FIG. 1;

FIG. 3 is a sectional view taken on line 3—3 of FIG. 2;

FIG. 4 is a plan view of FIG. 3 with parts in section;

FIG. 5 is a plan view, on an enlarged scale, of a portion of a fluid-activated, gravity-flow conveyor embodying another form of the invention with parts in section;

FIG. 6 is a sectional view taken on line 6—6 of FIG. 5; and

FIG. 7 is a sectional view taken on line 7—7 of FIG. 5.

FIG. 8 is a plan view, of another form of the invention;

FIG. 9 is a sectional view taken along line 9—9 of FIG. 8;

FIG. 10 is a sectional view taken along lines 10—10 of FIG. 9.

Referring first to the form of the invention disclosed in FIG. 1, the fluid-activated, gravity-flow conveyor 1 is of the type disclosed in Schemm Patent No. 2,527,455 and comprises a slightly inclined conveying trough 2 having a gas-permeable deck or surface 3 along which the material is adapted to flow. The gas-permeable deck may be made of any suitable material such as heavy woven fabric having the desired uniformly low gas permeability. The gas-permeable deck includes a plurality of sections, each overlying a plenum chamber 4 to which gas is supplied through inlet openings 5.

Material to be conveyed along the gas-permeable deck is supplied to the upper end of the conveyor from a supply hopper 6. The flow of material from the hopper to the upper end of the conveyor preferably is controllable such as by a shut-off valve 7.

Air entering the plenum chamber 4 passes upwardly through the gas-permeable deck and fluidizes the overlying pulverulent material, causing it to flow by gravity downwardly along the gas-permeable deck.

The conveyor shown in FIGS. 1-4 is for the purpose of supplying material to plural offtake pipes. Therefore, the lower end thereof may be closed; or if a continually flowing stream along the conveying surface is desired, means may be provided for recycling material from the lower end of the conveyor back to the supply hopper 6.

Offtake pipes 8 are spaced lengthwise along the conveyor. These offtake pipes are located directly beneath the conveyor and are adapted to recive material from the conveyor for conduction to bins or the like which may be associated with volumetric feeders for bag-filling machines.

To permit discharge of material flowing along the gas-permeable decks of the conveyor into the offtake pipes, the several sections of the gas-permeable deck and their underlying plenum chambers terminate at the upstream and downstream edges of each offtake pipe to provide an intervening gate positioned in the space over the top of the respective offtake pipes. A laterally displaceable shuttle or gate section 9 is located in each of the intervening spaces over the offtake pipes. These gate sections each comprise a plenum chamber 10 and an overlying gas-permeable deck 11 which is in the plane of the conveying surface formed by the gas-permeable decks 3. The bottom of the plenum chamber 12 protrudes beyond each side wall to provide outwardly-extending flanges 13 and 13' which are slidably received in guides 14 and 14' formed in the sides of the offtake pipes 8 and lateral extensions 8' of the offtake pipes at their upper ends. An actuating rod 15, attached to one end of the gate section, extends through the outer end of the extension 8' for engagement by any suitable actuating means here represented as a handle 16.

A side plate 17 extends along the edge of the gas-permeable deck 11 at the side thereof remote from the side to which the actuating rod 15 is attached. This plate forms an abutment which engages the side of the conveyor trough 2 when the gate section is pushed all the way in, as shown by dotted line C of FIG. 3, and at such times assures alignment of the gas-permeable deck 11 with the gas-permeable deck section 3. It also prevents lateral flow of the material over the inner side of the gate section when the latter is opened in that the side plate engages a flexible wiper 18 on the other sidewall.

The wiper blade 18 may be formed of rubber or the like and is attached to the inside of the side wall of the conveyor trough 2 beneath which the gate section is adapted to move. Its lower side bears against the upper surface of the gas-permeable deck 11 and assures that the fluidized pulverulent material does not flow laterally over the adjacent side edge of the gas-permeable deck with possible clogging of the guides 14 and 14' in which the flanges 13 and 13' slide. If a sufficiently close fit were provided between the upper surface of the gas-permeable deck 11 and the lower edge of the side wall of the conveying trough to prevent flow of material over the side edge of the gas-permeable deck, there might be undue wear on the upper surface of the gas-permeable deck.

The plenum chamber 10 is supplied with fluidizing gas from adjacent plenum chamber 4 through a pipe 19 and a flexible hose 20. There is sufficient slack in the hose 20 to permit positioning of the gate section 9 in any desired position.

When the gate sections 9 are moved to their innermost or "in line" position, their gas-permeable decks 11 are aligned with the gas-permeable decks 3 of the adjacent conveyor sections, forming a continuous conveying surface of uniform width, so that there is no discharge of material into any of the offtake pipes 8. Under such conditions, if the end of the conveyor is closed, there is no flow of material along the conveyor, but the conveyor is filled with a body of fluidized material ready to flow into the offtake pipes as soon as one or more of the gate sections are opened. If the end of the conveyor is arranged for recycle, the material will flow through the conveyor and be recycled back to the hopper 6 without any of it being discharged into the offtake pipe.

When it is desired to discharge material into one or more of the offtake pipes, the gate sections are pulled outwardly, i.e. laterally of the flowing stream (toward the left as shown in FIGS. 3 and 4), to provide a gap 21 between the innermost side of the gate section and the adjacent side wall of the trough 2. The material flowing along that side of the conveyor then will flow or spill through the gap into the offtake pipe.

If it is desired to maintain a uniform head of material in the offtake pipes, as is usually the case when the offtake pipes supply volumetric feeders, all of the gates may be left in partly open positions such that sufficient material will flow through the gap 21 into the offtake pipes to maintain the offtake pipes full at all times while permitting some material to flow beyond to the next gate sections.

Each time the flowing stream of the fluidized pulverulent material flows over a partially open gate section and onto the next adjacent downstream section of the conveyor, the narrower stream of the material flowing from the gate section is redistributed over the entire width of the conveyor, so that when the flowing stream reaches the next downstream gate section, the stream is of full conveyor width; and if that gate section is only partially open, the side edge portion of the stream will flow or spill through the gap and into the underlying offtake conduit.

The form of the invention shown in FIGS. 5, 6 and 7 is designed to supply material automatically to the offtake pipes in sufficient amount to maintain them full so that a uniform supply of material will be maintained in the offtake pipes. In this form of the invention the conveyor 27 is of the same general construction as the conveyor 1 of FIGS. 1 to 4 and comprises a conveying trough 28 and a gas-permeable deck or conveying surface 29. However, the plenum chamber 30 of each section is separated from the plenum chambers of the adjacent sections and is separately supplied with fluidizing gas from a main manifold 31 through branch conduits such as the conduits 32 and 36, having valves 37 to 41.

Offtake pipes, such as pipes 42, 43 and 44, are positioned directly beneath the conveyor, and their upper ends open directly into the bottom of the conveyor. Directly over each offtake pipes the gas-permeable conveying surface or deck 29 and its underlying plenum chamber 30 is narrower than the gas-permeable deck and the plenum chamber at each side thereof to provide alternating wide sections 29a, 29b and 29c and narrow bridge sections 29b and 29e to form gate spaces or gaps 46 and 46'. The gaps 46, 46' are in open communication with the upper ends of the offtake pipes and are formed between the sides of each of the narrow gas-permeable deck sections 29d and 29e and their underlying plenum chambers and the sides of the conveyor. Material flowing along the outer edge portions of the adjacent upstream wider sections 29a and 29b of the conveyor may flow or spill into the respective offtake pipes. The sides of the narrower conveying sections are provided with upwardly-extending side plates 47 of such width as to assure that at all times during operation a certain amount of material will be conveyed across to the next wider section without spilling off the narrow bridging section.

All of the offtake pipes except the last one 44 have slide valves 48 so that when desired, the flow of material from those offtakes may be shut off as may be required for maintenance or repair of the equipment served by the offtake.

In this form of the invention it is desired to provide for recycling excess material from the lower end of the conveyor. To this end a return pipe 49 extends from the lower end of the conveyor to a pneumatic conveyor 50 which returns all material flowing along the conveyor and not discharged into the offtake pipes through the pipe 51 back to the supply hopper (not shown).

In order to place the conveyor of FIGS. 5-7 into operation, all the slide valves 48 except the slide valve of offtake pipe 42 are closed. Valve 37 in branch conduit 32 is opened and valves 38 to 41 in branch conduits 33 to 36 are left closed so that gas flows through branch conduit 32 to its associated plenum chamber beneath the wider section 29a of the conveyor. Material is then admitted to the upper end of the conveyor trough from the hopper and flows along the conveying deck until it reaches the narrow conveying section 29d over offtake pipe 42. Since no air is flowing into the plenum chamber 30 of the narrow section 29d, material overlying it will not be fluidized and will pipe up on it and stop the flow of material along the central portion of the conveying deck. However, the material will be fluidized on the adjacent upstream wider section 29a and will flow from the end of that section, at its sides, into the spaces 46 and 46' until the offtake pipe 42 is filled.

After offtake pipe 42 has been filled, the slide valve 48 of offtake pipe 43 is opened and valves 38 and 39 in branch conduits 33 and 34 are opened to supply fluidizing gas through those branch conduits to their associated plenum chambers beneath the sections 29d and 29b, respectively, of the conveyor. Material on the narrower section 29d over offtake pipe 42 will now be fluidized and will flow therealong and onto the next wider section 29b. When the fluidized material reaches the wider section 29b, it will be redistributed to the full width of that section and will flow downwardly therealong until it reaches the upper end of the narrow bridge section 29e over offtake pipe 43. Since no gas flows through the plenum chamber of section 29e, the material which flows onto it from the adjacent wider section 29b will not be fluidized and will pile up and stop further downward flow of material from the central portion of the section 29b. However, material will flow from the edge portions of the section 29b into the spaces 46 and 46', over offtake pipe 43, until that offtake pipe is filled.

After offtake pipe 43 has been filled, valves 40 and 41 in branch conduits 35 and 36 are opened to permit fluidizing gas to flow through those branch conduits to the plenum chambers beneath the conveyor sections 29e and 29c. This will fluidize material on the narrow section 29e over offtake pipe 43 and material will flow therealong and onto the flowing downstream wider section 29c. When the material flows onto the upper end of the wider section 29c, it will be redistributed to the full width of the conveyor and will flow downwardly along the section 29c and into offtake pipe 44 until it is full. Excess material is then recycled by the pneumatic conveyor 50 back to the supply hopper.

The system is now in condition for normal operation. In normal operation, the slide valves 48 are opened and the material flows along the full width of the conveyor deck until it reaches the first narrow section 29d over offtake pipe 42. If that offtake pipe is not full, the flowing stream of fluidized material is split, with the side portions thereof flowing through the spaces 46 and 46' into the upper end of the offtake pipe 42. The central portion continues its downward flow and passes over the narrow bridging section 29d to be redistributed on and to flow downwardly over the wider section 29b. When the material reaches the lower end of the section 29b, it is again split with the side portions flowing through the spaces 46 and 46' into the offtake pipe 43, if that offtake pipe is not full, while the central portion passes along the narrow bridging section 29e and onto the last downstream wider section 29c. The flowing stream is again redistributed to the full width of the conveyor and passes over section 29c to be discharged from its lower end into the last offtake pipe 45, if that offtake pipe is not full. Any excess material will be returned to the supply hopper by the conveyor 50.

The roof of the conveying trough of FIGS. 5, 6 and 7 preferably is provided with closeable inspection openings over each of the narrow sections 29c and 29d.

An alternative way of placing the system in condition for operation is to open the valves 32 to 36 in all of the branch conduits 37 to 41 and permit the fluidized material to flow along the conveyor until it flows or spills over the lower end of the wider section 29c into the offtake pipe 44. During this operation the valves 48 in offtake pipes 43 and 42 may be closed, or they may be left open to cause a simultaneous filling of offtake pipes 43 and 42. If they are closed, they are progressively opened as offtake pipes 44 and 43 are filled.

If desired, means may be provided for actuating the valves 37 to 41 and also the slide valves 48 at the upper end of the offtake pipes by remote control.

If it is desired to fill only the offtake pipe 42, that may be done in the manner first described above, that is, by opening only the valve 37 in branch conduit 32. If it is desired to fill only offtake pipes 42 and 43, that may also be done as first described above, but leaving valve 37 in branch conduit 41 closed. Also, if it is not desired to fill either of offtake pipes 42 and 43, that may be accomplished merely by closing the slide valves 48 of those offtake pipes.

When accurate samples of the flowing stream in the conveyor 1 are desired, the modified form of the invention shown in FIGS. 8–10 is particularly advantageous. To obtain representative samples for analysis, it is necessary to remove a part of said material from the total amount being conveyed, and remove it in such a way that the proportion and distribution of the quality, i.e., size of particles, moisture content, specific gravity, mineral or chemical composition, etc., is a truly representative sample of the total material being conveyed. The present invention removes a full cross-sectional sample of the flowing stream to provide such a representative sample.

As shown in FIGS. 8–10, the sampling discharge apparatus 55 serves a slightly inclined conveying trough 1a having a gas-permeable deck or surface 3a along which material is adapted to flow. This gas-permeable deck includes a plurality of sections, each overlying a plenum chamber 4a. In order to permit the sampling discharge of material flowing along from the conveyor trough 1a, two adjacent sections of the gas-permeable deck 3a are spaced apart, thereby defining a sampling gate space 60 between the adjacent ends of the two deck sections. The sampling space 60 has a shuttle assembly 9a therein which includes two intermediate gas-permeable conveying sections 61, 61' spaced from each other by an adjustable assembly such as the turnbuckle 62 to define a gap 62'. Each intermediate gas-permeable conveying section has a plenum chamber 63, 63' respectively.

The sides of the intermediate sections carry flanges 64, 64' abutting the adjacent ends of the permeable gas deck sections of the conveyor trough. The flanges 64 are slidably received by a guide 65 formed in the sides of the offtake pipes 8a. The guide 65 and flanges 64 make it possible to reciprocate the shuttle assembly laterally across the stream of flowing pulverulent material in the conveyor 1a.

In order to move the intermediate sections 61 laterally, an actuating rod 15a is connected to a convenient point of the shuttle assembly, such as to the plenum chamber of one of the intermediate sections. Although the actuating rod 15a may be operated manually, if necessary, it is preferable to use a mechanical or other suitable drive for reciprocating the shuttle assembly. However, whether operated by hand or by any other means, it is important that a uniform traversing rate be employed.

The plenum chambers 63, 63' are supplied with a fluidizing gas from the supply lines 5a to the adjacent plenum chamber 4a by flexible hoses 66, 66' which are of sufficient length to permit each intermediate section to move to a position directly between the adjacent ends of the gas-permeable deck 3a of the conveyor trough.

It is to be understood that both intermediate sections 61, 61' are substantially as long, in the directional flow of the material along the conveyor 1a, as the sample gate space 60 between the adjacent ends of the gas-permeable deck sections 3a of that conveyor. Also, each intermediate section 61, 61' is at least as wide as the width of the gas-permeable deck 3a of the conveyor trough and preferably has non-aerating borders, conveniently defined by the mounting flanges 67, 67' which underlie the side walls 2a and the cover of the casing 8a to provide a material seal along the edges of the deck. The gas-permeable decks of both the conveyor trough and intermediate sections are arranged to lie in substantially the same plane.

In the normal operation of this form of the invention, one of the intermediate sections 61 or 61' is positioned in alignment with the gas permeable decks 3a of the conveyor. In this position, the pulverulent material is conveyed along the conveyor and over the aligned intermediate section.

When it is desired to extract a sample of material from the pulverulent material being conveyed, the shuttle assembly is moved at a uniform rate, laterally across the path of flow, presenting material to the gap 62'. The material above the travelling gap spills through and into the offtake pipe 60. Since the gap 62' is moved across the entire width of the flowing stream of material and draws material from the full height of the stream, a uniform sample of material is obtained that is representative of the full cross-sectional area of flow of the material.

The total volume of material discharged from the conveyor through the gap 62 in a single traverse may be readily controlled by selection or adjustment of the width of the gap 62', and by selection or adjustment of the speed of traverse of the shuttle assembly.

Various changes may be made in the details of the invention as described without sacrificing the advantages thereof or departing from the spirit or the scope of the invention as set forth in the appended claims.

I claim:

1. A bin-filling system comprising a fluid-activated, gravity-flow conveyor for pulverulent material including a casing forming a conveyor trough, at least two spaced gas-permeable deck sections forming a portion of the bottom of said trough and along which pulverulent material is adapted to flow, said deck sections lying in substantially the same plane, a plenum chamber beneath each deck section, means for introducing a gas into each of said plenum chambers to flow upwardly through the gas-permeable deck sections to fluidize overlying pulverulent material, an offtake pipe located beneath the space between adjacent ends of said deck sections, an intermediate conveying section in the space between the adjacent ends of the deck sections and over the upper end of said offtake pipe, said intermediate conveying section including a deck section substantially in the plane of said first-named deck sections, a plenum chamber under the gas-permeable deck of said intermediate section, means for introducing a gas into said last-named plenum chamber to pass upwardly through the overlying gas-permeable deck to fluidize pulverulent material thereon, and means for providing a gap between a longitudinal edge of the intermediate conveyor section, in the direction of flow of material along the conveyor, and at least one side wall of the casing through which material flowing along the conveyor may flow or spill into said offtake pipe.

2. A bin-filling system comprising a fluid-activated, gravity-flow conveyor for pulverulent material including a casing forming a conveying trough, at least two spaced gas-permeable deck sections forming a portion of said trough, along which pulverulent material is adapted to flow, a plenum chamber beneath each deck section, means for introducing a gas into each plenum chamber to flow upwardly through the overlying gas-permeable decks to fluidize pulverulent material thereon, an offtake pipe located beneath the space between adjacent ends of said gas-permeable deck sections, a gate section in the space between the adjacent ends of said deck sections and over the upper end of said offtake pipe, said gate section including a gas-permeable deck section, a plenum chamber beneath the gas-permeable deck of said gate section and means for introducing a gas into said last-named plenum chamber to pass upwardly through the overlying gas-permeable deck to fluidize pulverulent material thereon, and means mounting said gate section for movement laterally with respect to the direction of flow of material through said conveyor trough, whereby said gate section may be moved to a position to provide a gap between one side thereof and a side of the casing through which material flowing along the conveyor may flow or spill into the offtake pipe.

3. A bin-filling system as defined in claim 2 in which the spaced gas-permeable deck sections and the gas-permeable deck section of the gate section lie in substantially the same plane.

4. A bin-filling system as defined in claim 3 in which the gas-permeable deck of said gate section is substantially as long, in the direction of flow of material along the conveyor, as the space between adjacent ends of said spaced, gas-permeable deck sections and is at least substantially as wide as the space between the spaced, gas-permeable deck sections, whereby, when the gate section is closed, the gas-permeable deck thereof and said spaced, gas-permeable decks form a substantially continuous conveying surface of uniform width.

5. A bin-filling system as defined in claim 2 in which gas is supplied to the plenum chamber of said gate section from the plenum chamber of one of the plenum chambers underlying one of said spaced, gas-permeable decks.

6. A bin-filling system as defined in claim 5 in which the means for supplying gas to the plenum chamber of the gate section includes a flexible conduit section, and said flexible conduit section is of sufficient length to permit the gate section to be fully opened and fully closed.

7. A bin-filling system as defined in claim 2 in which the mounting means for said gate section includes spaced guides extending transversely of the conveyor, and the gate section has outwardly-extending flanges extending into said guides.

8. A bin-filling system as defined in claim 7 in which the guides are formed in the upper end of the offtake pipe.

9. A bin-filling system as defined in claim 2 in which the inner side of the gate section has an upwardly-extending plate extending in a direction lengthwise of the conveyor.

10. A bin-filling system for conveying pulverulent material including a casing forming a conveying trough, a gas-permeable deck forming the bottom of said trough, said gas-permeable deck having alternating narrower and wider sections, the narrower sections providing a gap between at least one longitudinal edge thereof, in the direction of flow of material along the conveyor, and at least one side of the casing, a plenum chamber beneath each of the wider and narrower sections, means for introducing a gas into the plenum chamber beneath each section to pass upwardly through the overlying gas-permeable deck to fluidize pulverulent material thereon, and an offtake pipe underlying said gap and adapted to receive material flowing or spilling into said gap from the edge portion of the adjacent upstream, wider portion of the gas-permeable deck.

11. A bin-filling system as defined in claim 10 including means for controlling the supply of gas to the plenum chambers underlying all of said sections, the means for controlling the supply of gas to each narrower section being at least independent of the means for controlling the supply of gas to the adjacent upstream, wider section.

12. A bin-filling system as defined in claim 11 including means for independently controlling the supply of gas to the plenum chambers underlying all of the sections.

13. A bin-filling system as defined in claim 10 in which the narrower section has both its side edges spaced from the respective side edges of the casing to provide a gap at each side of the narrower section, and the offtake pipe underlies both gaps.

14. A bin-filling system as defined in claim 10 in which the edge of the narrower section adjacent the gap has an upstanding plate extending longitudinally in the direction of flow along the conveyor.

15. A bin-filling system as defined in claim 10 in which the downstream end of the casing is bottomless to provide an opening substantially the full width of the conveyor into which material discharged from the end of the last gas-permeable downstream section flows, and an offtake pipe is positioned beneath said opening.

16. A bin-filling system as defined in claim 15 including means for returning material flowing along the conveyor and not discharged into the offtake pipes to the upper portion of the conveyor.

17. A bin-filling system as defined in claim 2 in which a wiper blade is attached to the inside wall of the casing adjacent the outer side of the gate section, said wiper blade overlying the gate section and having its lower edge adjacent the upper surface of the gas-permeable deck of the gate section.

18. A bin-filling system for pulverulent material, including a casing forming a conveyor trough, at least two spaced gas-permeable deck sections forming a portion of the bottom of said trough along which pulverulent material is adapted to flow, said deck sections lying in substantially the same plane, a plenum chamber beneath each deck section, an offtake pipe located beneath the space between adjacent ends of said deck sections, at least two intermediate gas-permeable conveying sections arranged in tandem and adapted to be moved laterally with respect to the directional flow of the material through the conveying trough, said intermediate sections lying in substantially the same plane as said deck sections, a plenum chamber beneath each said intermediate section, means for introducing a gas into each of said plenum chambers to flow upwardly through the gas-permeable deck sections to fluidize the pulverulent material, and means for providing a gap between said intermediate sections through which material flowing along the conveyor may flow or spill into said offtake pipe.

19. A bin-filling system for pulverulent material, including an elongated gas-permeable deck and means for passing a gas upwardly through the gas-permeable deck to aerate overlying material, at least two sections of said gas-permeable deck being longitudinally spaced from each other in the direction of material flow, an intermediate section of the gas-permeable deck located in the space between the adjacent ends of the spaced deck sections, said intermediate deck section comprising at least two intermediate gas-permeable conveying sections spaced tandem apart laterally and adapted to move laterally with respect to the directional flow of the material through the conveyor trough between the adjacent ends of said deck sections, said intermediate sections lying in substantially the same plane as said spaced deck sections, a plenum chamber beneath each said intermediate section, and means for introducing a gas into each of said plenum chambers to flow upwardly through the gas-permeable deck sections to fluidize the pulverulent material.

20. The bin-filling system of claim 19, including a means for adjustably interconnecting said intermediate conveying sections.

21. A bin-filling system as defined in claim 19 in which the gas-permeable deck of each intermediate section is substantially as long, in the direction of flow of material along the conveyor, as the space between adjacent ends of said spaced gas-permeable sections, and is at least substantially as wide as the space between the spaced gas-permeable deck sections.

22. A fluid-actuated gravity conveyor having an elongated gas-permeable deck and means for passing a gas upwardly through the gas-permeable deck to aerate overlying material, at least two sections of said gas-permeable deck being longitudinally spaced from each other in the direction of material flow, an intermediate section of the gas-permeable deck located in the space between the adjacent ends of the spaced deck sections, and means positioning a longitudinal edge of the intermediate gas-permeable deck section inwardly from at least one side wall and the corresponding longitudinal edges of the spaced deck sections to provide a discharge gap in the gas-permeable deck.

23. Apparatus according to claim 22 in which the inwardly positioned edge is permanently fixed.

24. The apparatus of claim 22 in which the gas-permeable deck has a shuttle section which includes the inwardly positioned edge, and means for reciprocating the shuttle section transversely of the gas-permeable deck in the plane of the gas-permeable deck surface.

25. Apparatus according to claim 24 in which said shuttle section includes at least two intermediate deck sections spaced from each other and aligned with each other in the reciprocation plane and in the line of reciprocation, said reciprocating means being operable to position said intermediate deck sections in alternate alignment with the remaining deck sections.

References Cited by the Examiner
UNITED STATES PATENTS

| | | | |
|---|---|---|---|
| 2,517,837 | 8/1950 | Browne | 302—29 |
| 2,527,394 | 10/1950 | Browne | 302—29 |
| 2,740,671 | 4/1956 | Sayre | 302—29 |
| 2,804,349 | 8/1957 | Pynor | 302—29 |
| 3,097,889 | 7/1963 | Linhart | 302—29 |

HUGO O. SCHULZ, *Primary Examiner.*

ANDRES H. NIELSEN, *Examiner.*